(12) United States Patent
Saeufferer et al.

(10) Patent No.: US 11,229,981 B2
(45) Date of Patent: Jan. 25, 2022

(54) MACHINE TOOL HAVING TWO TOOL SPINDLES

(71) Applicant: STAMA Maschinenfabrik GmbH, Schlierbach (DE)

(72) Inventors: Andreas Saeufferer, Uhingen (DE); Thomas Boehm, Eislingen (DE); Guido Spachtholz, Stuttgart (DE); Frank Mueller, Stuttgart (DE)

(73) Assignee: STAMA Maschinenfabrik GmbH, Schlierbach (DE)

( * ) Notice: Subject to any disclaimer, the term of this patent is extended or adjusted under 35 U.S.C. 154(b) by 156 days.

(21) Appl. No.: 16/570,611

(22) Filed: Sep. 13, 2019

(65) Prior Publication Data
US 2020/0001417 A1 Jan. 2, 2020

Related U.S. Application Data

(63) Continuation of application No. PCT/EP2018/055441, filed on Mar. 6, 2018.

(30) Foreign Application Priority Data

Mar. 20, 2017 (DE) ...................... 10 2017 105 933.4

(51) Int. Cl.
*B23Q 1/01* (2006.01)
*B23Q 1/03* (2006.01)
(Continued)

(52) U.S. Cl.
CPC .......... *B23Q 3/15539* (2016.11); *B23Q 1/012* (2013.01); *B23Q 1/03* (2013.01);
(Continued)

(58) Field of Classification Search
CPC ...... B23Q 1/012; B23Q 1/03; B23Q 3/15539; B23Q 3/15753; B23Q 3/15706;
(Continued)

(56) References Cited

U.S. PATENT DOCUMENTS

| 2,075,008 A * | 3/1937 | Damm | B23Q 1/525 |
| | | | 409/168 |
| 3,312,370 A * | 4/1967 | Kolarich | B23Q 3/15722 |
| | | | 221/13 |

(Continued)

FOREIGN PATENT DOCUMENTS

| DE | 102009025099 A1 | 1/2010 | |
| DE | 102010024348 A1 * | 12/2010 | .............. B27M 1/08 |

(Continued)

OTHER PUBLICATIONS

International Search Report for international Application No. PCT/EP2018/055441, dated Jun. 8, 2018.

(Continued)

*Primary Examiner* — Boyer D Ashley
*Assistant Examiner* — Michael Vitale
(74) *Attorney, Agent, or Firm* — Jason H. Vick; Sheridan Ross, PC

(57) ABSTRACT

A machine tool is provided with two vertically oriented tool spindles that are arranged to hold tools and that are movable vertically in a first direction and horizontally in a second direction orthogonal to the first direction. Furthermore, the machine tool is provided with two workpiece support devices for clamping workpieces in place. At least one of the two workpiece support devices is movable horizontally in a third direction orthogonal to the first and the second direction. The two tool spindles and the two workpiece support devices are mounted on a common machine frame with a common working space, wherein the two tool spindles are movable parallel to one another in the second direction. The two tool spindles are facing one another.

13 Claims, 4 Drawing Sheets

(51) Int. Cl.
*B23Q 3/157* (2006.01)
*B23Q 3/155* (2006.01)

(52) U.S. Cl.
CPC ........ *B23Q 3/15706* (2013.01); *B23Q 3/1572* (2013.01); *B23Q 3/15713* (2013.01); *B23Q 3/15766* (2013.01)

(58) Field of Classification Search
CPC .............. B23Q 3/15766; B23Q 3/1572; B23Q 3/15722; B23Q 3/15724; B23Q 39/04; B23Q 3/15713; Y10T 483/1717; Y10T 483/175; Y10T 483/179; Y10T 483/1793; Y10T 483/1795; Y10T 483/1845; Y10T 483/1855; Y10T 483/1873; Y10T 483/1882; Y10T 483/1891
USPC ......... 483/37, 54, 55, 56, 63, 64, 66, 67, 68
See application file for complete search history.

(56) References Cited

U.S. PATENT DOCUMENTS

| | | | | |
|---|---|---|---|---|
| 3,606,033 A | * | 9/1971 | Barilla | B23K 37/0452 414/777 |
| 3,966,052 A | * | 6/1976 | Knaus | B25H 3/04 211/70.6 |
| 4,780,852 A | * | 10/1988 | Kajigaya | G11C 11/4096 365/203 |
| 5,293,022 A | * | 3/1994 | Onandia-Alberdi | B23H 7/26 219/69.11 |
| 5,364,329 A | * | 11/1994 | Line | B23Q 3/15539 483/56 |
| 5,882,286 A | * | 3/1999 | Aufiero | B23Q 39/023 483/55 |
| 7,367,929 B2 | | 5/2008 | Feinauer et al. | |
| 8,210,907 B2 | * | 7/2012 | Walter | B24B 33/02 451/61 |
| 2002/0131836 A1 | | 9/2002 | Ferrari et al. | |
| 2007/0199187 A1 | * | 8/2007 | Ohmori | B23C 3/002 29/27 C |
| 2014/0274627 A1 | | 9/2014 | Bernhard et al. | |
| 2018/0029143 A1 | * | 2/2018 | Cavezzale | B23C 3/002 |

FOREIGN PATENT DOCUMENTS

| | | | | |
|---|---|---|---|---|
| EP | 1240974 A2 | | 9/2002 | |
| EP | 1375059 A2 | * | 1/2004 | ........ B23Q 3/15526 |
| EP | 1834719 A1 | | 9/2007 | |
| EP | 2392439 A1 | | 12/2011 | |
| EP | 2777872 A1 | | 9/2014 | |
| FR | 2546793 A1 | * | 12/1984 | ........ B23Q 3/15713 |
| IT | RM20100138 A1 | | 9/2011 | |
| JP | 01-045541 A | * | 2/1989 | ........ B23Q 3/15722 |
| JP | 06-000741 A | * | 1/1994 | ........ B23Q 3/15539 |
| JP | 06-114666 A | * | 4/1994 | ........ B23Q 3/15539 |

OTHER PUBLICATIONS

Written Opinion for international Application No. PCT/EP2018/055441, dated Jun. 8, 2018.
German Examination Report for corresponding German Application No. 102017105933.4, dated May 21, 2019.
International Preliminary Report on Patentability for International Application No. PCT/EP2018/055441, dated Oct. 3, 2019.

* cited by examiner

MACHINE TOOL HAVING TWO TOOL SPINDLES

CROSS-REFERENCES TO RELATED APPLICATIONS

This application is a continuation of International patent application PCT/EP2018/055441, filed on Mar. 6, 2018, designating the U.S., which International patent application has been published in German language and claims priority to German patent application 10 2017 105 933.4, filed on Mar. 20, 2017. The entire contents of these priority applications are incorporated herein by reference.

BACKGROUND

The present disclosure relates to a machine tool having two spindles. More particularly, in certain embodiments, the t present disclosure relates to a machine tool having two vertically oriented tool spindles that are equipped to receive tools and are movable vertically in a first direction and horizontally in a second direction orthogonal to the first direction, and having two devices for clamping in place workpieces to be machined, wherein at least one of the devices is movable horizontally in a third direction orthogonal to the first and the second direction.

A similar machine tool is disclosed in U.S. patent application Ser. No. 11/724,660, now U.S. Pat. No. 7,367,929 B2, which is owned by the assignee of the present disclosure, and which is incorporated by reference herein. This reference discloses a machine tool having two machine frames that are arranged alongside one another and that are connected to one another. Each machine frame forms a separate working space in which a tool spindle is movable in three orthogonal directions with the aid of a traveling column.

The two working spaces are surrounded by a housing, wherein an opening is provided in the rear wall of each working space, a tool change magazine projecting through said opening into the working space, where it can be approached by the respective tool spindle for a tool change using the pickup method.

Provided in the first working space is a device for clamping in place workpieces to be machined, said device being pivotable about a horizontal axis.

Also provided is a second device, which can be moved back and forth between the first and the second working space and, in the first working space, receives a partially machined workpiece that can be finished in the second working space after the second device has been moved into the latter.

In this way, it is possible for example to machine a workpiece from bar stock on five sides in the first working space, then to transfer the workpiece into the second device and to cut it off the bar stock, whereupon the second device then moves into the second working space, where the sixth side of the workpiece can be machined.

Although this machine tool more than meets all the requirements for most application cases, it is potentially not rigid and compact enough for some applications, wherein the overall machining speed may also still be optimized, for instance in regard of workpieces.

US 2014/0274627A1 discloses a vertical machining center in gantry form, in which a machine frame in the form of a horizontal U encloses a working space, in which a device for clamping in place workpieces to be machined is mounted so as to be pivotable about a horizontal axis. The vertical tool spindle is mounted on the side walls of the U-shaped machine frame.

Arranged within the machine frame is a circular tool magazine, at which the tool spindle can change tools using the pickup method.

Provided beneath the tool magazine is an identical tool magazine, in which further tools are kept available, which can be transferred between the two tool magazines with the aid of a transfer device arranged at an opening in the machine frame.

The machining center described in US 2014/0274627A1 makes it possible to machine a wide variety of workpieces with a large number of tools, although the workpiece can be machined only in one setting.

A disadvantage with this machining center is that many workpieces cannot be finished within the machining center, given the above constraints.

In view of this, it is an object of the present disclosure to present a machine tool that has a compact design.

It is a further object of the present disclosure to present a machine tool having a considerably rigid design.

It is a further object of the present disclosure to present a machine tool that is suitable for machining complex workpieces. It is further object of the present disclosure to present a machine tool that is suitable for machining workpieces on six sides thereof. Is a further object of the present disclosure to present a machine tool that is configured for high-speed machining.

SUMMARY

These and other objects are achieved by a machine tool, comprising two vertically oriented tool spindles, the two tool spindles being movable vertically in a first direction and horizontally in a second direction, which is orthogonal to the first direction, and two workpiece support devices for supporting and clamping workpieces to be machined, wherein at least one of the two workpiece support devices is movable horizontally in a third direction, which is orthogonal to the first and the second direction, wherein the two tool spindles and the two workpiece support devices are mounted on a common machine frame that defines a common working space, and wherein the two tool spindles are movable parallel to one another in the second direction and are facing one another.

In a further aspect of the present disclosure, the above and other objects of the present disclosure are achieved by a machine tool, comprising two vertically oriented tool spindles, the two tool spindles being movable vertically in a first direction and horizontally in a second direction, which is orthogonal to the first direction, two workpiece support devices for supporting and clamping workpieces to be machined, and at least one tool change magazine for changing tools, the at least one tool change magazine being arranged in a stationary manner, wherein at least one of the two workpiece support devices is movable horizontally in a third direction, which is orthogonal to the first and the second direction, wherein the two tool spindles and the two workpiece support devices are mounted on a common machine frame that defines a common working space, wherein the two tool spindles are movable parallel to one another in the second direction and are facing one another, wherein the machine frame has two portal beams that extend in the second direction and parallel to one another, wherein a first one of the two tool spindles is mounted on a first one of the two portal beams, wherein a second one of the two tool spindles is mounted on a second one of the two portal beams, wherein the machine frame has a base plate and a first and a second end wall, wherein the first portal beam is formed at the first end wall, wherein the second portal beam is formed at the second end wall, and wherein the at least one tool change magazine comprises an inner end which is permanently arranged in the working space.

In exemplary embodiments in accordance with the present disclosure, the machine tool is equipped with two tool spindles and two workpiece support devices, wherein the two spindles and the two workpiece support devices are mounted on a common machine frame with a common working space, and wherein the two tool spindles are movable parallel to one another in the second direction and face one another. In certain embodiments, the common machine frame has a common base plate.

As used herein, a common working space is understood to be the space in which the workpieces and tools are moved. The working space can in this case be larger than the actual machining space in which the workpieces are machined with the tools. The tool spindles can be moved out of the machining space for example in order to change the workpiece. Hence, it is possible for said machining space to be separated from the rest of the working space by casing walls. The machining space may generally be referred to as chip space since in the machining space the material-removing machining and thus the chip generation takes place.

In accordance with the present disclosure, the two tool spindles of the machine tool are located opposite one another and, so to speak, in a head-to-head manner. The two tool spindles are not arranged alongside one another, as is the case in U.S. Pat. No. 7,367,929 B2.

This allows, at least in certain embodiments, a compact and rigid structure of the machine tool and short transport paths within the working space, thereby allowing the workpieces to be guided through quickly. Furthermore, in certain embodiments, the machine tool is considerably rigid, due to the overall machine frame.

Because, according to the present disclosure, only short paths have to be covered between the devices and/or the tool spindles, it is therefore possible to machine the workpieces quickly with the machine tool, at least in certain embodiments.

As used herein, the device for clamping workpieces to be machined may be arranged as a jig, at least in certain exemplary embodiments. More generally, the device for clamping workpieces may be referred to as workpiece support.

Since, in certain embodiments, the machine tool has two devices for clamping in place workpieces, the workpieces can be transferred between the devices, and so even complex workpieces can not only be machined but also finished in the machine tool.

The transfer of the workpieces from one device to the other can take place for example with the aid of a spindle gripper clamped in place in one of the tool spindles, wherein it is also possible for a workpiece transport device to be provided in the working space.

Alternatively, it is also possible to design at least one of the two devices in a movable manner, as is known from U.S. Pat. No. 7,367,929 B2 mentioned herein before, such that the workpiece can be transferred directly from the first device to the second.

In certain embodiments, the machine frame comprises two portal beams that extend in the second direction and parallel to one another, wherein one of the tool spindles is mounted on one of said portal beams, respectively, so as to be movable in the first and the second direction.

This may have the effect that the machine tool is configured in the manner of a dual portal machine, wherein the two portal beams extend parallel to one another and hold the two tool spindles between one another, said tool spindles being movable parallel to the portal beams and perpendicular to the portal beams.

This results in a very rigid machine tool, which also has a very compact structure.

In certain embodiments, the machine frame is provided with a base plate and two end walls, at the upper ends of which, respectively, one of the portal beams is formed. In other words, there is a single, common base plate for the two opposite portal beams.

In certain embodiments, in this way, a very rigid machine frame may be formed, which also allows very precise and reproducible machining of the workpieces even at high traveling speeds of the tool spindles. This may also contribute to the machining speed of the machine tool, at least in accordance with certain aspects described herein.

As seen from the second direction, that is, in the plane defined by the first and the third direction, the machine frame is configured in a U-shaped manner with portal beams facing one another. The portal beams extend in the direction of the working space, that is as seen in the third direction, just to the front of the end walls, such that the end walls form, so to speak, a hook at their top.

In certain embodiments, the two devices are movable in the third direction, for which purpose a guide that extends in the third direction is provided and, for instance, arranged on the base plate. The two devices are mounted on the guide.

In certain embodiments, it is possible that, by moving at least one of the two devices, a workpiece partially machined in the first device can be transferred to the second device. Hence, the device or the two devices only has/have to cover a very short path in order to present this partially machined workpiece to the second tool spindle for finishing. Finishing may for instance involve machining on a sixth side.

In certain embodiments, only two directions of movement are realized on the part of the tool spindle, while the third direction of movement is realized in the respective device. This may apply to longitudinal movements. In certain embodiments, this may result in a very rigid machine tool, since tilting moments are largely avoided in the tool spindles. This may also have positive effects on precision and speed of machining.

Due to the short movement paths and the direct transfer of the partially machined workpiece from the first device to the second, the total machining time of a workpiece is reduced.

In certain embodiments, at least one of the two devices has a pivot axis, which extends in the second direction, for instance.

A workpiece that is clamped in place in this device can be machined on all sides and surface regions that are not clamped in place in the device, at least in certain embodiments. This may allow complete rapid machining of a workpiece in the machine tool described herein.

In certain embodiments, at least one tool change magazine, which is arranged in a stationary (immovable) manner, is arranged for changing tools using the pickup method, wherein said tool change magazine is arranged at least with its inner end permanently in the working space. In other words, in certain embodiments, the inner end of the tool change magazine permanently protrudes into the working space. In certain embodiments, a direction of the protrusion into the working space is basically parallel to the second direction.

In certain embodiments, a tool change using the pickup method is possible at any time and it is not necessary for the tool change magazine to be moved into the working space first of all for this purpose. This also contributes to a short total machining time of a workpiece. For the tool change, in certain embodiments, the tool spindle in question optionally travels out of the machining space. For this purpose a door may be provided in the casing wall is optionally opened, and which separates the inner end of the tool change magazine from the machining space, at least in certain embodiments.

In certain embodiments, a tool change magazine is provided for each tool spindle.

Hence, more tools can be provided, such that the workpieces can be machined in a more flexible manner, at least in certain embodiments.

In certain embodiments, each tool change magazine projects with its outer end out of the working space in the second direction.

In contrast to US 2014/0274627A1 mentioned herein before, the tool change magazine is not entirely arranged within the machine frame but projects, so to speak, laterally out of the machine frame. In certain embodiments, the tool change magazine considerably projects beyond and out of the machine frame. This contributes to a compact structure of the machine tool. Further, also a larger number of tools may be stored in the tool change magazine, at least in certain embodiments, since the dimensions of the tool change magazine are not limited by the dimensions of the machine frame.

Furthermore, in certain embodiments, a tool storage magazine is arranged above at least one of the tool change magazines, wherein said tool storage magazine is located between the associated portal beam and the tool change magazine in the first direction.

In such a way, in certain embodiments, the number of available tools can be increased even further, thereby further increasing the flexibility of machining of a workpiece.

In certain embodiments, the or each tool storage magazine is set back in the second direction with its inner end with respect to the inner end of the tool change magazine that is located beneath the tool storage magazine, such that the magazines located one above the other have a terraced arrangement. Hence, the or each tool storage magazine is located further rearward (for instance, shifted to the outside) than the associated tool change magazine.

In certain embodiments, quick and easy access for the tool spindle is possible not only to the upper tool storage magazine but also to the lower tool change magazine. Access is, so to say, basically permanently available and neither of the magazines has to be moved for a tool change, at least in certain embodiments. The tool spindle can in this case also transfer tools between the tool change magazine and the tool storage magazine.

In certain embodiments, at least one transfer device is provided, in order to transfer tools between the tool change magazine and the tool storage magazine arranged above the latter.

In certain embodiments, the tool spindle has to approach only the tool change magazine located, which is placed beneath the tool storage magazine. This means that the tool spindle has to carry out only short strokes in the vertical and horizontal directions, that is the first and the second directions, in order to change tools and then to approach the workpiece again, for instance. In certain embodiments, these "short Z- and Y-axes" allow not only a very rigid and compact structure of the machine tool but also a short chip-to-chip time, which in turn allowing rapid machining of the workpieces.

In certain embodiments, a transfer device for each tool change magazine is provided.

In certain embodiments, the transfer of tools for both tool spindles can take place at the same time, which may result in further time savings during machining.

In certain embodiments, the or each transfer device is arranged outside the working space, next or adjacent to the machine frame in the second direction.

In certain embodiments, the working space is free of the or each transfer device, and so the working space can be constructed overall in a compact manner because it does not have to provide any unnecessary storage space for further mechanical parts. This, too, results in a compact and thus rigid machine tool.

Furthermore, the transfer devices arranged outside the working space next to the machine frame allow easy and problem-free maintenance, wherein the loading and unloading of tools can also be realized quickly and without problems. The machine tool in accordance with the present disclosure may thus also be converted quickly and flexibly for the machining of new workpieces, for which at least some tools have to be replaced from the tool change magazine and/or tool storage magazine.

In certain embodiments, for each tool change magazine and for each tool storage magazine there is provided a separate, own casing. In the alternative, in certain embodiments, a common casing is provided for the tool change magazine and the tool storage magazine which is arranged above the latter. Hence, the arrangement of the two magazines is provided with a common casing.

As a consequence, in certain embodiment, those regions of the magazines that are located outside the machine frame are protected without the casing of the machine tool itself having to be formed in a protruding manner.

It is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein.

EXEMPLARY EMBODIMENTS

Figure 1:
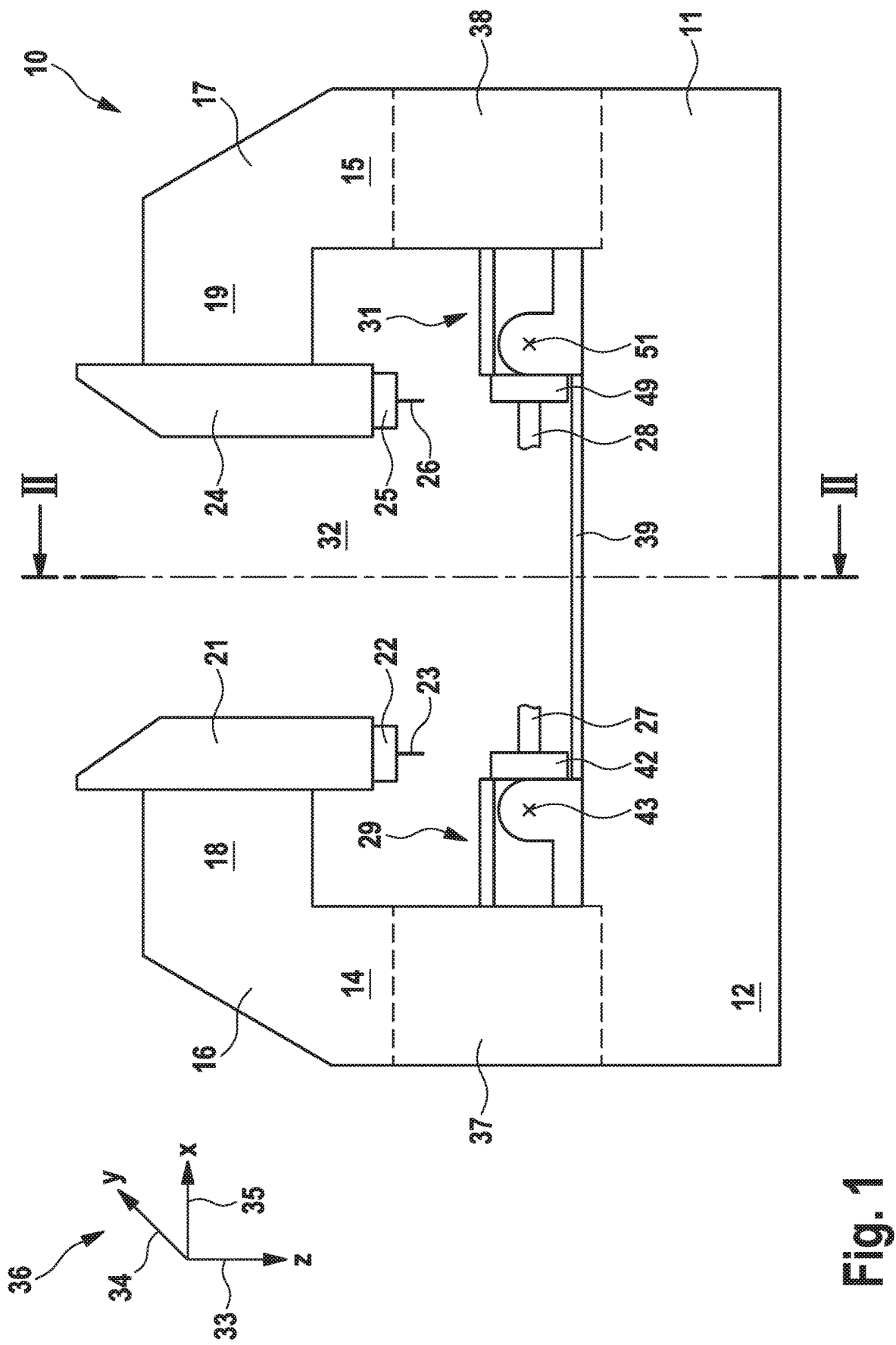
FIG. 1 is a side view of an exemplary embodiment of a machine tool.

FIG. 1 shows a side view, which is not necessarily true to scale, of a machine tool 10, which has an upwardly open, U-shaped machine frame 11. The individual components of the machine tool 10 are indicated merely schematically. It is to be noted in this context that it is not necessarily the specific particular design but rather the general layout, arrangement and interaction that may contribute to potential advantages that are realized with the structure of the machine tool 10 in accordance with at least some exemplary embodiments of the present disclosure. However, this shall not be understood to be limiting.

The machine frame 11 comprises a base plate 12, from which two end walls 14, 15 protrude vertically, at each of the upper ends 16, 17 of which a portal beam 18, 19 is arranged. The base plate 12, end walls 14, 15, and portal beams 18, 19 are either formed integrally with one another or manufactured as separate components and subsequently connected firmly together, for example bonded together.

Mounted on the portal beam 18 is a spindle head 21, which supports a rotatable tool spindle 22, that is, a tool spindle 22 which is rotatable about a spindle axis and in which a tool 23 has been clamped in place. Also arranged on the portal beam 19 is a spindle head 24 that supports a tool spindle 25 which is rotatable about a spindle axis and in which a tool 26 has been clamped in place.

The tools 23 and 26 serve to machine workpieces 27 and 28 that have been clamped in place in schematically illustrated devices 29 and 31, which can turn the workpieces 27 and 28 about their longitudinal axes in a generally known manner for positioning and/or setting them in rotation for machining by turning. This is not to be understood to be limiting.

The tool spindles 22 and 25 and the devices 29 and 31 are arranged in a common working space 32 that is enclosed by the machine frame 11. In the working space 32, the tools 23, 26 and the workpieces 27, 28 are moved in order in this way to be able to machine the workpieces 27, 28 and transfer them between the devices 29, 31, and to be able to change the tools 23, 26.

To this end, the tool spindles 22 and 25 are movable on the portal beams 18, 19, extending parallel to one another, in a first direction 33 via the spindle heads 21 and 24, respectively, said first direction 33 extending vertically and being identified generally as the Z-axis.

Furthermore, the tool spindles 22 and 25 are movable on the portal beams 18, 19 in a second, horizontal direction 34, orthogonal to the first direction 33, via the spindle heads 21, 24, said second direction 34 being identified generally as the Y-axis and extending perpendicularly into the plane of the drawing in FIG. 1.

The two tool spindles 22, 25 are spaced apart from one another in a third direction 35 that is orthogonal to the first and second directions 33, 34 and is identified generally as the X-axis and extends horizontally.

The spindle heads 21 and 24 are located opposite to one another in a "head-to-head" manner in the direction 35.

Figure 2:
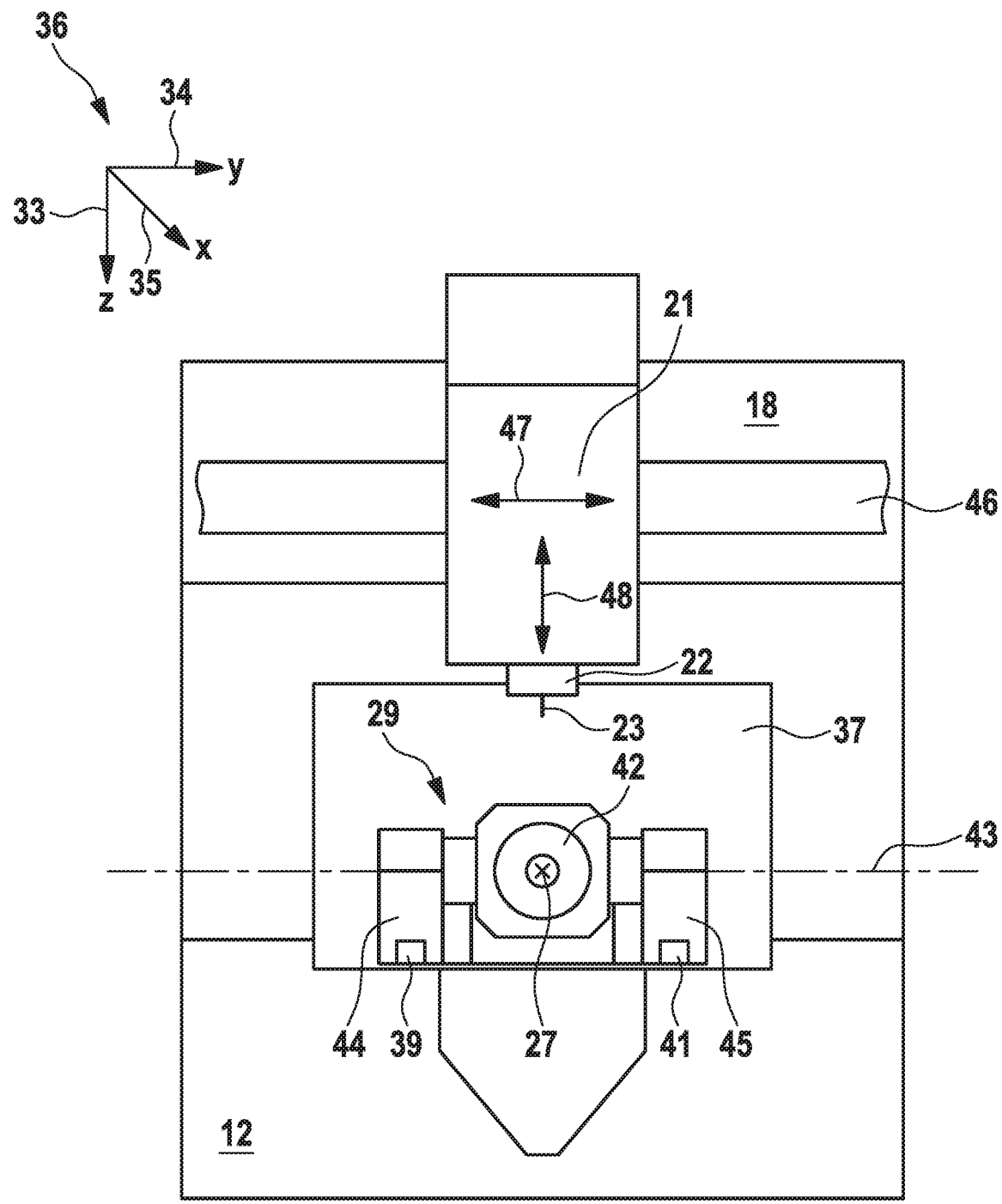
FIG. 2 is a sectional illustration of the machine tool of FIG. 1, as seen along the line II-II in FIG. 1.
Figure 3:
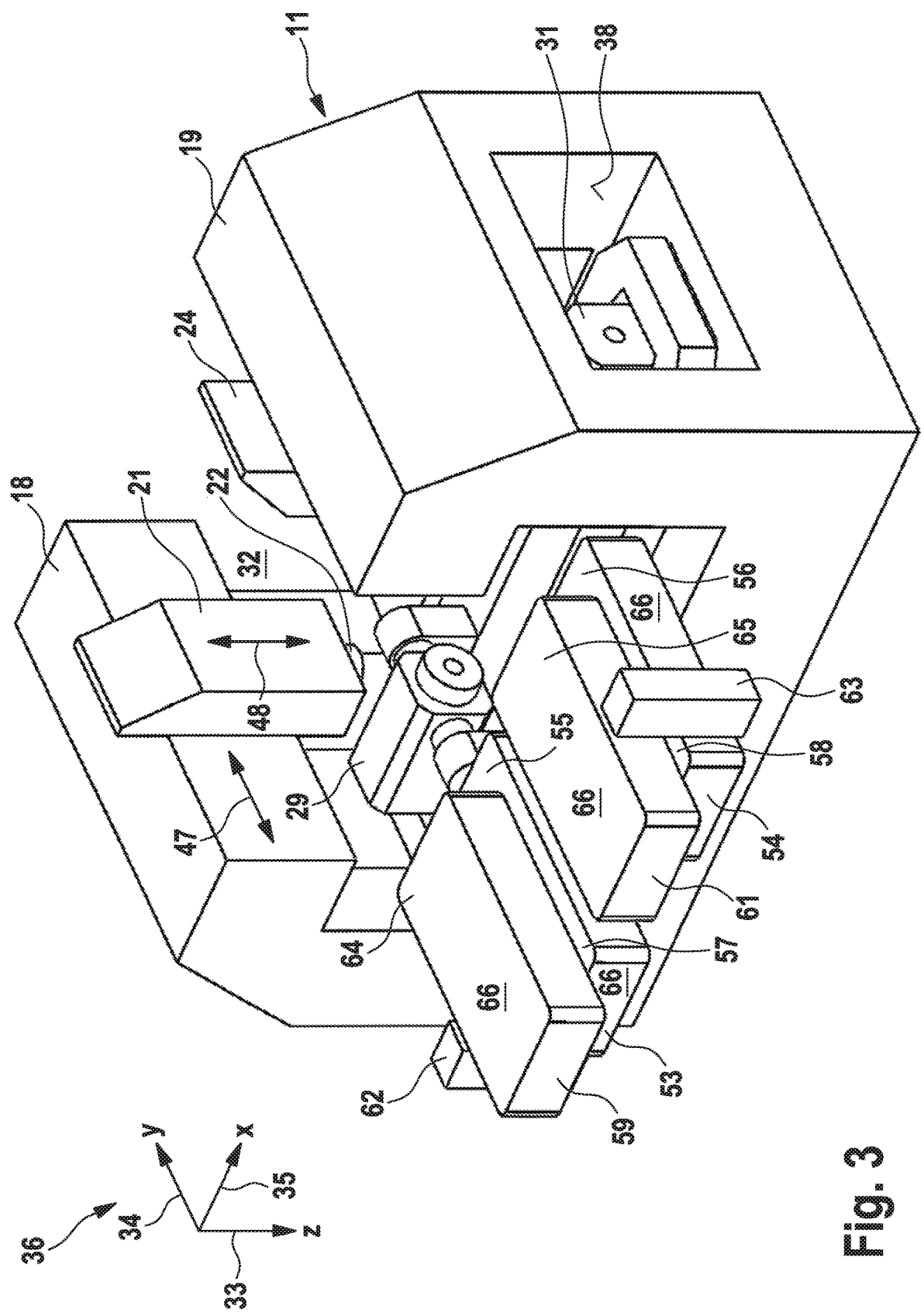
FIG. 3 is a perspective top view of the machine tool of FIG. 1, wherein the tool change magazine and tool storage magazine, which are omitted in FIGS. 1 and 2 for clarity reasons, are shown.
Figure 4:
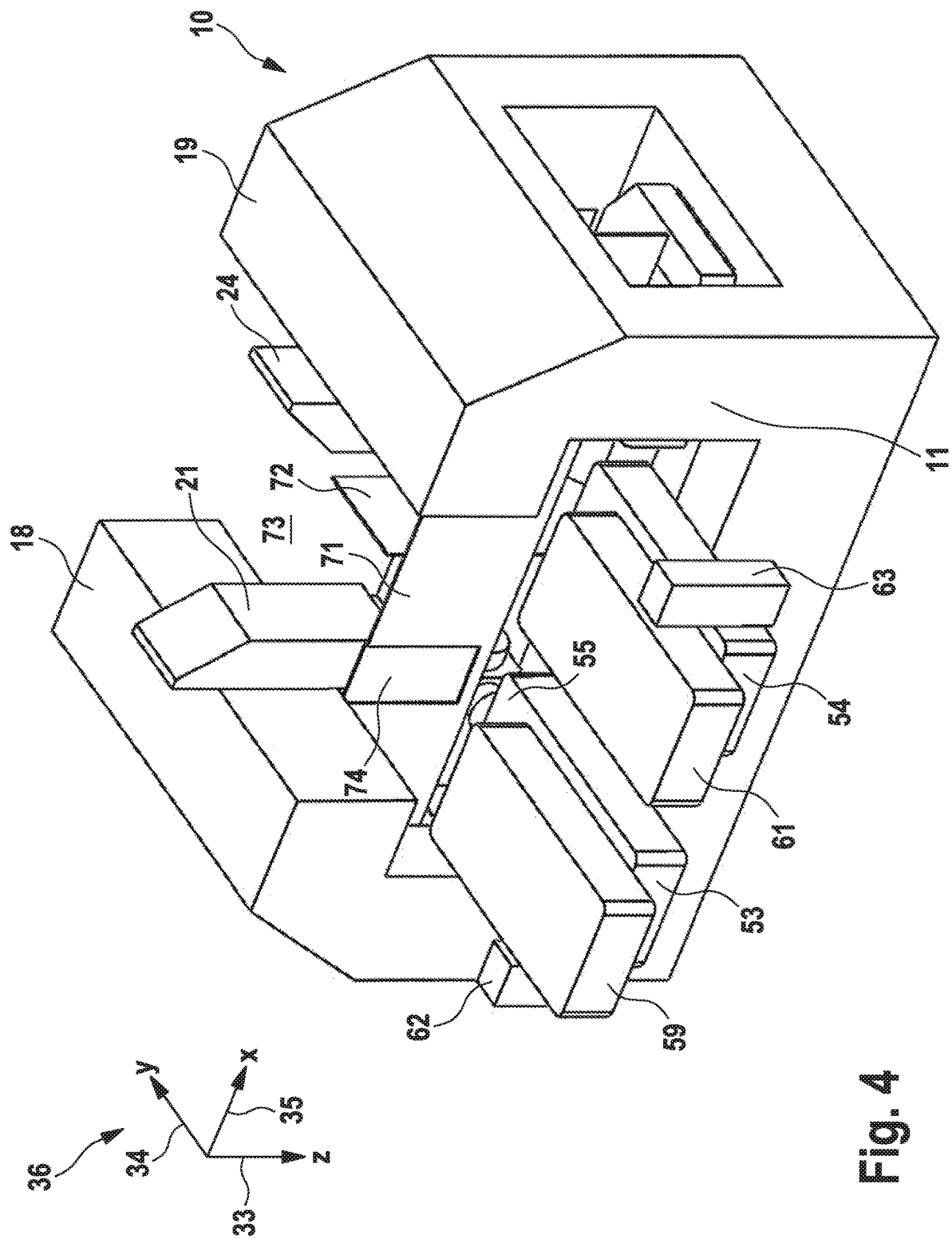
FIG. 4 shows, in an illustration similar to the arrangement of FIG. 3, an embodiment of a machine tool with casing walls that delimit a machining space within the working space.

Shown at the top left of FIG. 1 is a coordinate system 36, which indicates the orientation of the directions 33, 34 and 35. The coordinate system 36 is also illustrated in FIGS. 2 to 4.

An opening 37 is provided in the end wall 14 and an opening 38 is provided in the end wall 15. The opening 37 serves to feed an unmachined workpiece 27, while the opening 38 serves to transport a finished workpiece 28 away.

The workpieces 27, 28 are fed and transported away in a basically conventional manner.

It should also be mentioned that the two devices 29 and 31 are movable in the third direction 35, for which purpose guides 39 and 41, of which only the guide 39 can be seen in FIG. 1, are arranged on the base plate 12.

FIG. 2 shows a sectional illustration of the machine tool 10 in FIG. 1 as seen along the line II-II in FIG. 1.

In FIG. 2, first of all the two guides 39, 41 for the device 29 can be seen, with which said device 29 can be moved in the third direction 35. The device 31 also travels on the guides 39, 41.

The device 29 has a spindle 42 with which the workpiece 27 can be turned or rotated about its longitudinal axis. The spindle 42 is mounted, in a manner pivotable about a pivot axis 43, on two side plates 44, 45, via which the entire device 29 is movable in the third direction 35 along the guides 39, 41. The pivot axis 43 is oriented parallel to the second direction 34.

It is also apparent from FIG. 2 that the portal beam 18 extends in the second direction 34 and has a guide 46 on which the spindle head 21 can be moved in the second direction 34.

As mentioned above, the spindle head 21 is also movable in the first direction 33. Arrows 47 and 48 indicate the movability of the spindle head 21 in the second direction 34 and in the first direction 33.

It goes without saying that the spindle head 24 is mounted on the portal beam 19 in a movable manner in the same way as the spindle head 21 on the portal beam 18.

Furthermore, the device 31 is constructed and movable and pivotable in the same way as the device 29. Thus, the two devices 29, 31 run on the guides 39, 41 such that partially machined workpieces 27 can be transferred between them.

In FIG. 1, numeral 49 indicates the spindle of the device 31, with which the workpiece 28 can be turned and set in rotation. Furthermore, the pivot axis of the device 31 is shown at 51 in FIG. 1.

A workpiece that has been introduced through the opening 37 into the working space 32 and has been clamped in place in the spindle 42 of the device 29 is machined, using the tool 23 that has been clamped in place in the tool spindle 22, until all of the sides and faces that project out of the spindle 42 have been machined. To this end, the device 29 is moved in the third direction 35 and its spindle 42 optionally pivoted about the pivot axis 43.

When the partial machining of the workpiece 27 has been concluded, the device 29 travels in the direction towards the device 31 and/or the device 31 travels in the direction towards the device 29, whereupon the workpiece 27 is clamped in place in the spindle 49 and is available there as a partially machined workpiece 28 for further machining.

As a result of the device 39 being moved in the third direction 35 and/or of the spindle 49 being pivoted about the pivot axis 43, the partially machined workpiece 28 is now presented to the tool 26 in the tool spindle 25 such that all of the sides and faces that have not yet been machined can be finished.

When the workpiece 28 has been finished, the spindle 49 pivots about the pivot axis 51 through about 180° such that the workpiece 28 can be removed or unloaded in a suitable manner through the opening 38.

Since the workpieces 28, 27 require complex machining, two tools 23, 26 are not enough for machining, for which purpose tool magazines are provided, as will now be described in conjunction with FIG. 3.

FIG. 3 shows the machine tool 10 from FIGS. 1 and 2 in a perspective view from above, wherein the same reference signs indicate identical design features.

It is apparent from FIG. 3 that each spindle head 21, 24 has been assigned a tool change magazine 53, 54, which is arranged with its inner end 55, 56 permanently in the working space 32, while with its outer end 57, 58 it is arranged next to the machine frame 11 in the second direction 34, that is, it protrudes laterally out of the working space 32.

In each tool change magazine 53, 54, a plurality of tools 23, 26 are kept available in a manner known per se in what are known as magazine positions, which can be moved within a tool change magazine 53, 54 such that they are available at the inner end 55, 56 for the tool change.

As a result of the spindle heads 21, 24 being moved in the second direction 34 and the first direction 33, this again being indicated by the arrows 47, 48, the respective tool spindle 22, 25 can approach the inner end 55, 56 of the tool change magazine 53 or 54, respectively, and, using the pickup method, deposit tools 23, 26 in free magazine positions there and take new tools 23, 26 from occupied magazine positions.

Depending on the need for tools 23, 26 to be stored and the dimensions thereof, the tool change magazines 53, 54 can have different dimensions.

If the number of tools becomes very high, however, a tool storage magazine 59, 61 may be arranged above each tool change magazine 53, 54, wherein said tool storage magazine 59, 61 is arranged in the first direction 33 between the respective tool change magazine 53, 54 and portal beam 18, 19.

Provided in the tool storage magazine 59, 61 are further tools, which cannot be exchanged directly with the tool spindles 22, 25, however, but have to be transferred into the tool change magazine 53 or 54, respectively, for this purpose.

This transfer takes place using transfer devices 62, 63, which are arranged outside the working space 32 next to the machine frame 11 in the second direction 34 such that they can transfer tools 23, 26 between the tool storage magazines 59, 61 and the tool change magazine 53, 54.

Each tool storage magazine 59, 61 has an inner end 64, 65, which is set back in the second direction 34 with respect to the inner end 55, 56 of the tool change magazine 53, 54 located therebeneath, respectively, such that the magazines 53 and 59, and 54 and 61 are each arranged in a terraced manner. In this way, each tool change magazine 53, 54 located under the tool storage magazines 59, 61 can be approached at its inner end 55 or 56, respectively, by the tool spindles 22, 25 for a tool change using the pickup method.

It should also be noted that each tool change magazine 55, 54 and each tool storage magazine 59, 61 can have its own casing, this being identified by the reference sign 66 for all four magazines 53, 54, 59, 61. However, it is also possible to provide a common casing for the tool storage magazine 59 and the tool change magazine 55, and for the tool storage magazine 61 and the tool change magazine 54, respectively. The casings serve to protect the operating personnel and are intended to collect dripping coolant.

Because the tool storage magazines 59, 61 are arranged above the tool change magazines 53, 54, and the tool change takes place only at the lower tool change magazines 53, 54, the stroke in the first and the second direction 33, 34 that a spindle head 21, 24 has to carry out in order to be disengaged from the workpiece 27, 28 currently being machined and to approach the tool change position is very small, such that the machine tool 10 requires only a short Z- and a short Y-axis mechanism, which moves the respective spindle head 21, 24 in the direction of the first or second direction 33 or 34, respectively.

The arrangement of the four magazines 53, 54, 59, 61 transversely to the third direction 35 results overall in a very compact machine tool, which is extremely rigid due to the portal design, wherein the rigidity is increased further by the short dimensions in all three directions 33, 34, 35.

The spindle heads 21, 24 move only in the first direction 33 and the second direction 34, while the relative movement between the tool 23, 26 and workpiece 27, 28 in the third direction 35 is realized by the devices 29, 31.

This means that the spindle heads 21, 24 are not prone to tilting movements because they are not also moved in the third direction 35. This, too, contributes to the stiffness of the machine tool 10.

Furthermore, no X-axis mechanism with a separate drive is required for the tool spindles, resulting in a reduction in the moved masses. This allows higher dynamics.

Due to the high rigidity and the high dynamics of the machine tool 10, rapid travel movements both of the spindle heads 21, 24 and of the devices 29, 31 are possible without this resulting in precision problems or problems in the reproducibility of machining.

Conversely, this means that the workpieces 27, 28 can be machined very quickly with the machine tool 10 and tools 23, 26 can be changed very quickly.

Due to the short paths between the devices 29, 31, the partially machined workpieces 27 can also be transferred very quickly into the second device 31, such that, as a whole, the time required for the overall machining of a workpiece 27, 28 is very small, and so the entire machining time for a workpiece 27, 28 is very short.

In order to protect the environment and operating personnel from flying chips and spraying coolant, it is possible—as illustrated in FIG. 4—for a machining space 73, in which the machining of the workpieces 27, 28 with the tools 23, 26 takes place, within the common working space 32 to be separated off by schematically indicated casing walls 71.

In a manner similar to the casing wall 71, the machining space 73 is likewise separated off by a casing wall 71, which is not illustrated in FIG. 4, on its side remote from the magazines 53, 54, 59, 61.

These casing walls 71 extend in the first and the third direction 33, 35.

The front casing wall 71 in FIG. 4 has a door 74, through which the spindle head 21 can be retracted from the machining space 73 such that a tool change at the inner end of the tool change magazine 53 is possible. In the casing 66 of the tool change magazine 53, it is possible, for this purpose, for an opening that is optionally closable by a flap to be provided, through which it is possible to access the magazine positions—which are empty or fitted with tools 23, 26—in the interior of the tool change magazine 53.

For the spindle head 24, a corresponding door—which is not shown in FIG. 4, however—is provided in the casing wall 71.

Between the spindle heads 21, 24, a further casing wall 72 is indicated in the machining space 73, said further casing wall 72 extending in the first and second directions 33, 34. The casing wall 72 prevents chips that are produced during machining by one of the two spindle heads 21, 24 and coolant that is employed from passing into the working region of the other spindle head 24, 21.

Also provided in the casing wall 72 is a door—not apparent in FIG. 4—which is opened when one or both of the devices 29, 31 is moved in the third direction 35, in order to transfer or receive workpieces 27, 28.

Alternatively, the casing walls 71 can also be far enough apart from one another in the second direction 34 for the machining space 73 to correspond to the working space 32 at least in the second direction 34. At least the—lower—tool change magazines 53, 54 then project with their inner ends 55, 56 through the casing walls 71 into the working space 32, such that the tool change can take place there using the pickup method.

In order to protect the mechanism of the tool change magazine 53, 54 and the stored tools 23, 26 from chips and coolant, an access opening can again be provided in the casing 66, said access opening being opened up by a flap when a tool change is intended to take place.

What is claimed is:

1. A machine tool, comprising:
    two vertically oriented tool spindles, each of the two tool spindles being movable vertically in a first direction and horizontally in a second direction, which is orthogonal to the first direction,
    two workpiece support devices for supporting and clamping workpieces to be machined,
    a first tool change magazine and a second tool change magazine that are arranged in a stationary manner,
    a first tool storage magazine and a second tool storage magazine that are arranged in a stationary manner,
    a first transfer device that is arranged to transfer tools between the first tool change magazine and the first tool storage magazine, and
    a second transfer device that is arranged to transfer tools between the second tool change magazine and the second tool storage magazine,
    wherein at least one of the two workpiece support devices is movable horizontally in a third direction, which is orthogonal to the first direction and the second direction,
    wherein the two tool spindles and the two workpiece support devices are mounted on a common machine frame that defines a common working space,
    wherein the two tool spindles are movable parallel to one another in the second direction and are facing one another,
    wherein the machine frame has two portal beams that extend in the second direction and parallel to one another,
    wherein a first tool spindle of the two tool spindles is mounted on a first portal beam of the two portal beams,
    wherein a second tool spindle of the two tool spindles is mounted on a second portal beam of the two portal beams,
    wherein the first tool spindle is movable in the first direction with respect to the first portal beam, and in the second direction along the first portal beam,
    wherein the second tool spindle is movable in the first direction with respect to the second portal beam, and in the second direction along the second portal beam,
    wherein each of the first tool change magazine and the second tool change magazine comprises a respective inner end, which is permanently arranged in the common working space, so that accessibility for one of the first tool spindle and the second tool spindle for a pickup tool change is provided,
    wherein the first tool change magazine and the first tool storage magazine are associated with the first tool spindle,
    wherein a first virtual straight line, which is oriented parallel to the vertically-extending first direction, extends through the first tool change magazine and the first tool storage magazine,
    wherein the second tool change magazine and the second tool storage magazine are associated with the second tool spindle,
    wherein a second virtual straight line, which is oriented parallel to the first direction, extends through the second tool change magazine and the second first tool storage magazine,
    wherein each of the first transfer device and the second tool transfer device is arranged externally to the footprint of the machine frame so as to be disposed completely outside of the common working space,
    wherein the first tool storage magazine comprises each of a respective inner end and a respective outer end that are spaced away from one another in the second direction,
    wherein the second tool storage magazine comprises each of a respective inner end and a respective outer end that are spaced away from one another in the second direction,
    wherein the first tool change magazine and the first tool storage magazine are offset at their respective inner ends in the second direction so that only the first tool change magazine is accessible to the first tool spindle for the pickup tool change, and
    wherein the second tool change magazine and the second tool storage magazine are offset at their respective inner ends in the second direction so that only the second tool change magazine is accessible to the second tool spindle for the pickup tool change.

2. The machine tool of claim 1,
    wherein the machine frame has a base plate and a first end wall and a second end wall,
    wherein the first portal beam is formed at the first end wall, and
    wherein the second portal beam is formed at the second end wall.

3. The machine tool of claim 2,
    wherein the two workpiece support devices are movable in the third direction.

4. The machine tool of claim 2, further comprising:
    a guide that extends in the third direction,
    wherein the guide is arranged on the base plate, and
    wherein the two workpiece support devices are mounted on the guide.

5. The machine tool of claim 1,
    wherein at least one of the two workpiece support devices has a pivot axis.

6. The machine tool as claimed in claim 1,
    wherein each of the first tool change magazine and the second tool change magazine projects with its respective outer end out of the common working space in the second direction.

7. The machine tool of claim 1,
    wherein the first tool storage magazine is arranged above the first tool change magazine,
    wherein the second tool storage magazine is arranged above the second tool change magazine,
    wherein the first tool storage magazine is located, in the first direction, between the first portal beam of the machine frame and the first tool change magazine, and wherein the second tool storage magazine is located, in the first direction, between the second portal beam of the machine frame and the second tool change magazine.

8. The machine tool as claimed in claim 7,
wherein the inner end of the first tool storage magazine faces the common working space,
wherein the inner end of the second tool storage magazine faces the common working space,
wherein the inner end of the first tool change magazine is in the second direction offset from the inner end of the first tool storage magazine and protrudes into the common working space,
wherein the inner end of the second tool change magazine is in the second direction offset from the inner end of the second tool storage magazine and protrudes into the common working space,
wherein the inner end of the first tool storage magazine is set back in the second direction with respect to the inner end of the first tool change magazine, and
wherein the inner end of the second tool storage magazine is set back in the second direction with respect to the inner end of the second tool change magazine.

9. The machine tool of claim 7,
wherein for each of the first tool change magazine and the second tool change magazine a respective separate casing is provided, and
wherein for each of the first tool storage magazine and the second tool storage magazine a respective separate casing is provided.

10. The machine tool of claim 1,
wherein the first tool storage magazine is arranged above the first tool change magazine,
wherein the second tool storage magazine is arranged above the second tool change magazine.

11. The machine tool of claim 10,
wherein a first pair of magazines is formed by the first tool change magazine and the first tool storage magazine, and
wherein a second pair of magazines is formed by the second tool change magazine and the second tool storage magazine.

12. The machine tool of claim 1,
wherein the first transfer device is arranged outside the common working space and, in the second direction, adjacent to the machine frame, and
wherein the second transfer device is arranged outside the common working space and, in the second direction, adjacent to the machine frame.

13. A machine tool, comprising:
two vertically oriented tool spindles, the two tool spindles being movable vertically in a first direction and horizontally in a second direction, which is orthogonal to the first direction,
two workpiece support devices for supporting and clamping workpieces to be machined,
at least one tool change magazine for changing tools, the at least one tool change magazine being arranged in a stationary manner,
at least one tool storage magazine that is arranged above the at least one tool change magazine such that a virtual straight line, which is oriented parallel to the vertically-extending first direction, extends through the at least one tool change magazine and the at least one tool storage magazine, and
at least one transfer device that is arranged to transfer tools between the at least one tool change magazine and the at least one tool storage magazine,
wherein at least one of the two workpiece support devices is movable horizontally in a third direction, which is orthogonal to the first direction and the second direction,
wherein the two tool spindles and the two workpiece support devices are mounted on a common machine frame that defines a common working space,
wherein the two tool spindles are movable parallel to one another in the second direction and are facing one another,
wherein the machine frame has two portal beams that extend in the second direction and parallel to one another,
wherein a first tool spindle of the two tool spindles is mounted on a first portal beam of the two portal beams,
wherein a second tool spindle of the two tool spindles is mounted on a second portal beam of the two portal beams,
wherein the machine frame has a base plate and a first end wall and a second end wall,
wherein the first one portal beam is formed at the first end wall,
wherein the second one portal beam is formed at the second end wall,
wherein the at least one tool change magazine comprises an inner end and an outer end, the inner end and the outer end spaced away from one another in the second direction,
wherein the inner end is permanently arranged in the common working space and the outer end projects out of the common working space,
wherein the at least one tool storage magazine comprises an inner end and an outer end, the inner end and the outer end spaced away from one another in the second direction,
wherein the at least one tool change magazine and the at least one tool storage magazine are offset at their respective inner ends in the second direction so that only the at least one tool change magazine is accessible to an associated one of the two tool spindles for a tool change in accordance with a pickup method, and
wherein the at least one transfer device is arranged externally to the footprint of the machine frame so as to be disposed completely outside of the common working space.

* * * * *